March 5, 1968     W. A. COCHRUM     3,372,366
FASTENING DEVICE
Original Filed Sept. 21, 1964
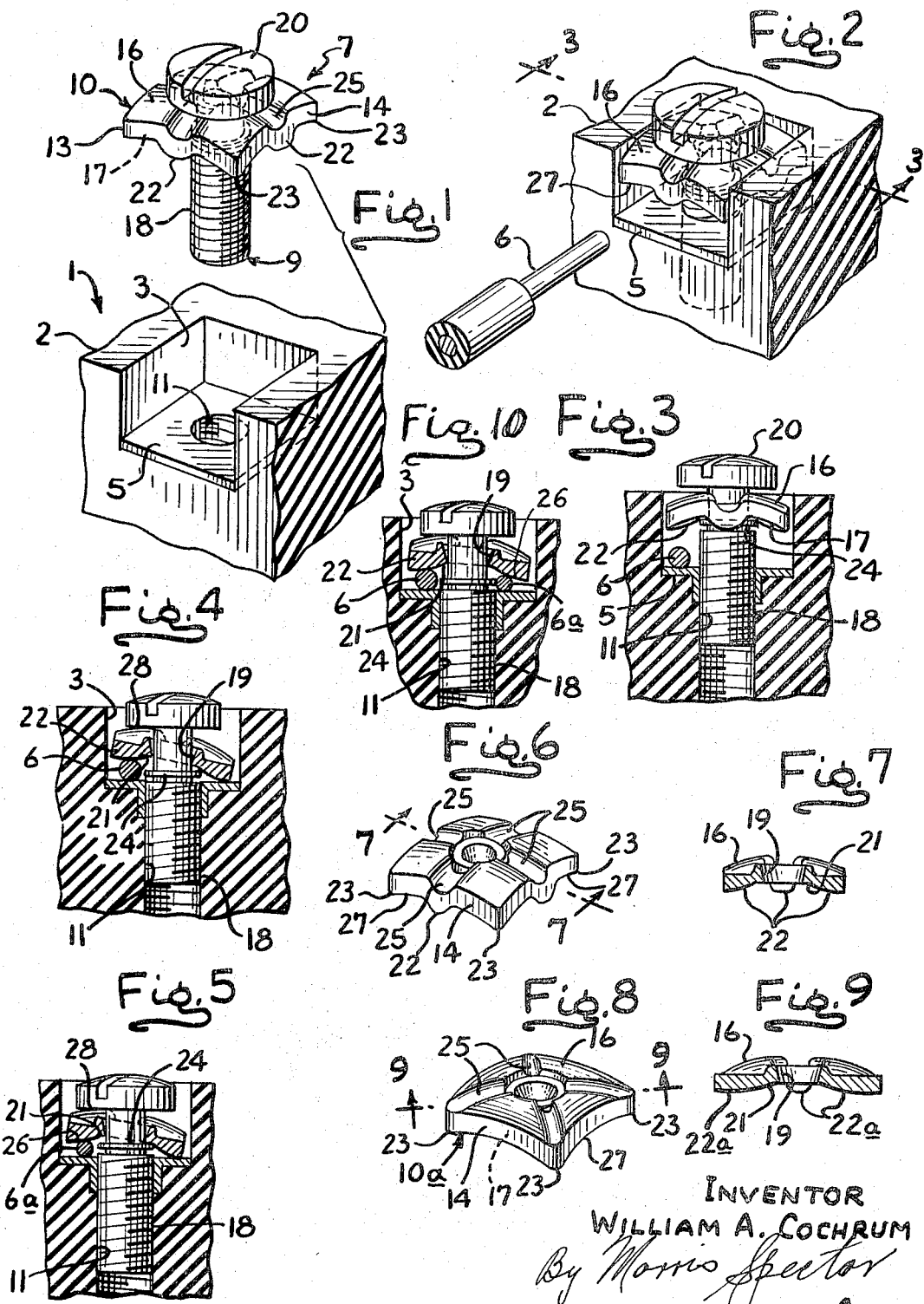
INVENTOR
WILLIAM A. COCHRUM
By Morris Spector
ATTY.

United States Patent Office 3,372,366
Patented Mar. 5, 1968

3,372,366
FASTENING DEVICE
William A. Cochrum, Bloomingdale, Ill., assignor to The Fastron Co., Franklin Park, Ill., a corporation of Illinois
Continuation of application Ser. No. 397,952, Sept. 21, 1964. This application Oct. 24, 1966, Ser. No. 589,133
8 Claims. (Cl. 339—272)

ABSTRACT OF THE DISCLOSURE

A fastener including a washer for securing a wire to an electrical terminal having a threaded recess. The washer having a body with a generally concave surface on one face and a generally convex surface on the opposite face. The body of the washer having an axial hole therethrough to receive a screw for threading into the recess to hold the wire between the concave surface of the washer and the terminal. The concave surface of the washer having rib means to grip the wire. The rib means being tapered to cam the wire towards the screw.

---

This invention is a continuation of my copending application Ser. No. 397,952, filed Sept. 21, 1964, and now abandoned, and relates to improvements in fastening devices of the type used in securing a wire to an electrical terminal. Such fasteners include a screw for threading into the terminal and a washer on the screw for holding the wire against the terminal.

In manufacturing fasteners of the type stated, the washers are first made and are thereafter assembled with screw blanks. The screw blanks are then successively subjected to a roll threading operation to form the threads on the screws. The washers are designed with differently shaped opposed faces, one face being intended to be presented toward the thread for ultimate engagement with the wire, the other face being intended for disposition against the head of the screw. This necessitates that the washers be properly oriented prior to assembly with the screw blanks. In one known type of high speed washer-screw assembly machine, the washers are fed to receptacles on a feed plate that then moves the washers successively to a screw-blank feeding station wherein the screw blanks are dropped into the hole in the washer. Before feeding the washers to the screw blank station, an attempt is generally made to orientate those washers which are not properly oriented. This has not been entirely successful with washers heretofore made, since those washers were of a generally flat configuration. The result was that many washers became assembled upside down on the screws.

It is, therefore, an object of the present invention to provide, for use in a fastener of the type and for the purpose stated, a washer that is capable of being readily oriented automatically in the washer-screw assembly apparatus. This is accomplished in the preferred form of the present invention by making the washers of a shallow cup shape rather than flat. When a group of washers are delivered to the receptacles in the feed plate, some have their convex faces presented upwardly and are thus properly oriented; the remainder have their concave faces presented upwardly and are improperly oriented. Those improperly oriented washers are less stably supported than the others and are easily oriented by passing a spring or other device across their upwardly presented edges to flip them over. On the other hand, the properly oriented washers are supported in a more stable manner and the spring or other device passes over them without turning them over.

In the roll threading operation, the metal of the screw blank is raised above the surface of the screw blank an amount greater than the diameter of the hole in the washer so that the thread prevents axial retraction of the washer from the screw. However, in a roll thread the end portion of the thread is of variable diameter and diminishes to zero at the surface of the blank. Since it is the end portion of the thread that serves to retain the washer on the screw and that portion is, in part, of smaller diameter than the hole in the washer, there is a tendency for the washer to telescope with the smaller diameter length of thread and jamb therewith.

Accordingly, it is a further object of the present invention to provide a fastener in which the screw has a radially projecting flange-like abutment that is axially between the thread and the head of the screw and is of a diameter sufficiently greater than the end of the washer hole adjacent thereto to prevent retraction of the washer from the screw and at the same time allow the washer to be freely rotatable on the screw.

It is an additonal and important object of the present invention to provide, in a fastener of the type stated, a washer which is constructed to permit use of the fastener with a wide range of wire sizes. In the preferred form of the invention, the hole in the washer is tapered from the convex to the concave face thereof. This allows the smaller diameter end of the washer hole to be sufficiently small to cause the washer to abut the aforementioned flange on the screw. At the same time the tapered hole permits the washer to tilt eccentrically to the axis of the screw to accommodate large sizes of wire. The washer is also formed with a recess on its concave face coaxial with the washer hole, which results in thinning the body of the washer around the hole. This recess is of larger diameter than the flange on the screw and receives same, and by reason thereof enables the washer to be used with small diameter wire.

It is also an object of the present invention to provide a washer in which the concave side thereof has rib means that grip one side of the wire to be fastened in the terminal, the rib means being of such extent as to prevent the edge of the washer from cutting the wire.

It is a further object of the present invention to provide a washer for use in a fastener of the type stated in which the edges of the ribs are contoured so as to crowd the wire away from the side of the terminal as the washer is tightened by the screw against the wire. This prevents the wire from being forced against the side of terminal and possibly cracking it.

It is another object of the present invention to provide a washer of the type stated which is in the shape of a regular polygon, such as a square, and may be used in different positions or orientation around the axis of the screw and still grip the wire properly.

The attainment of the above and further objects of the present invention will be apparent from the following specification taken in conjunction with the accompanying drawing forming a part thereof.

In the drawing:

FIG. 1 is an exploded perspective view of an electrical terminal and fastener, the latter being constructed in accordance with and embodying the present invention;

FIG. 2 is a perspective view of the fastener preparatory to insertion of the wire thereunder;

FIG. 3 is a fragmentary sectional view taken along line 3—3 of FIG. 2 and with the wire in place between the washer of the fastener and the conductor at the terminal;

FIG. 4 is a fragmentary sectional view similar to FIG. 3 and showing the fastener tightened to secure the wire to the terminal;

FIG. 5 is a sectional view similar to FIG. 4 and showing the fastener used with a small diameter wire;

FIG. 6 is a perspective view of the novel washer that forms part of the present invention;

FIG. 7 is a sectional view taken along line 7—7 of FIG. 6;

FIG. 8 is a perspective view of a modified form of washer that forms part of the present invention;

FIG. 9 is a sectional view taken along line 9—9 of FIG. 8; and

FIG. 10 is a sectional view similar to FIGS. 4 and 5 and showing the fastener used to secure two wires of different sizes to the terminal.

Referring now in more detail to the drawing, 1 designates an electrical terminal member of conventional type that includes an insulated base 2 of plastic or the like. The base 2 has a rectangular recess 3, the bottom of which has secured thereto a metallic contact strip 5, to which a wire conductor 6 may be secured by a fastener 7, the latter including a screw 9 and a metal washer 10. The contact strip 5 and the part of the base 2 therebelow has a threaded bore 11 for receiving the screw 9.

The washer 10 has a body 13 which is substantially square shaped with an edge 14 of a perimetral size somewhat less than that of the recess 3. The body 13 is, furthermore, of a shallow cup-shaped configuration with a generally convex face 16 and, opposite thereto, a generally concave face 17. Centrally of the body 13 is an axially extending hole 19 of sufficient size for loosely receiving the screw 9 with the convex face 16 presented toward the head 20 of the screw 9 and the concave face 17 presented toward the threaded shank 18 of the screw. The hole 19 is tapered from the convex face to the concave face 17.

The body 13 is also deformed to provide ribs 22 that project axially from the concave surface 17. In the present form of the invention there are four ribs 22 which extend radially outwardly to the edge 14 and are disposed so as to form, in plan view, a cross. On the concave face and coaxial with the washer hole 19 is a recess 21 which results in a thinning of the washer body 13 around the hole 19. The height or axial projection of the ribs 22 from the concave surface 17 is variable and is generally tapered as at 26 from a minimum at or adjacent to the recess 21 to a maximum at or adjacent to the edge of the washer with the axially outermost edge portions of the ribs being approximately in the general plane formed by the four corner points 23 which are at the outer edge 27 of the concave surface 17.

The washer 10 may be manufactured in a conventional manner and then fed to a washer-screw assembling machine where the washers are assembled with the screw blanks. The ribs 22 are formed during the washer-making process by a suitable tool that makes U-shaped deformations in the material of the washer, and thus leaves grooves or flutes 25 on the convex face 17. The washers may be readily oriented in the machine since those washers which are resting on the convex faces 16 may be readily flipped over. When the washers are properly oriented the screw blank is dropped into the hole 19, and thereafter the shank of the screw is roll threaded. Furthermore, the roll threading dies may be shaped to rollform a radially outwardly raised annular bead or flange 24 on the shank of the screw blank between the end of the thread 18 and the head 20. This flange 24 is, however, of smaller diameter than the recess 21 to enable the flange 24 to telescope loosely therein.

In use the screw 9 is threaded into the bore 11 to move the washer 10 into the recess 3. After the washer is in the recess 3, the edge 14 engages portions of the base that form two opposite sides of the recess 3 to prevent the washer from turning relative to the screw. With the wire 6 placed between the washer 19 and the contact strip 5, the screw 9 is tightened by a screwdriver until that rib 22 which is adjacent to the wire and which extends transversely thereof engages the wire 6 to hold the wire 6 firmly against the contact strip 5, as shown in FIG. 4. The tapered hole 19 enables the washer to tilt eccentrically to the axis of the screw a greater amount than would be possible if the hole 19 were of uniform diameter. This permits the fastener to be used with relatively large diameter wires. Where small diameter wires 6a (FIG. 5) are used, the recess 21 enables the washer to shift toward the thread 18 and thus closer to the wire 6a than would be otherwise possible. Thus, by providing the recess 21, the washer will be able to move sufficiently close to the contact strip 5 to clamp small wire 6a.

The head 20 will apply pressure to the washer against the convex surface 16 at the region 28, which is radially between the wire 6 and the longitudinal axis of the washer. This insures that the pressure against the washer is applied in a generally axial direction so that the washer rib 22 is maintained in firm engagement against the wire.

Due to the fact that the ribs 22 extend axially outwardly beyond the edge 27, the wire 6 or 6a, as the case may be, will be gripped substantially entirely by the rib 22. The wire will be free of contact from the arcuate edge 27 that is sharp and constitutes the edge of the concave face 17. Thus, the rib 22 prevents that sharp edge 27 from cutting the wire.

The generaly tapered contour of the axial edge 26 of the rib 22 causes the wire to be crowded toward the screw 9 rather than against the side of the base 2. By reason thereof, the wire is prevented from exerting force against the side of the base and possibly cracking it. This is of particular importance when the fastener is used in terminal members of the type wherein the recesses are slots open at both ends and formed by ribs of plastic that project away from the part of the base at the sides of the contact strip.

When he screw 9 is unthreaded from the base 11 to permit removal of the wire 6, the flange 24 permits the screw to rotate easily without binding on the end portion of the thread 18 which might damage the thread.

FIGS. 8 and 9 show a modified form of washer 10a, which is similar to the washer 10, previously described. However, in the washer 10a, the ribs 22a extend radially from the recess 21 to the corners of the body 13 rather than to the sides thereof, as in the washer 10. Thus, the washer 10a, like the washer 10, may be positioned in the recess 3 in any position of orientation relative to the axis of the screw, and in the washer 10a, two of the ribs 22a will bear against the wire.

In FIG. 10 the fastener is shown securing two wires 6, 6a to the contact strip 5. These two wires may be of equal size or of unequal size, as illustrated. Preferably, one wire is on each side of the screw 9. The generally tapered edges 26 of the ribs 22 crowd each wire away from its adjacent side of the base 2.

In compliance with the requirements of the patent statutes, I have herein shown and described a preferred embodiment of the invention. It is, however, to be understood that the invention is not limited to the precise construction herein shown, the same being merely illustrative of the principles of the invention.

What is considered new and desired to be secured by Letters Patent is:

1. A fastener for securing a wire to an electrical terminal having a threaded recess, said fastener comprising a screw having a head and a threaded shank for threading into the recess, a wire-clamping washer having an axial hole therethrough for loosely receiving the screw, said hole being of such configuration as to permit tilting of the washer relative to the longitudinal axis of said shank, radially outwardly projecting flange means on the shank and being of a larger diameter than that of the minimum diameter of the hole and cooperating with said head for retaining the washer against retraction from the screw, said washer having a peripheral edge that surrounds the screw and said edge including first and second pairs of parallel edge portions for cooperating with opposed parallel side parts of the terminal to prevent rotation of the washer during assembly of the fastener with the terminal, one face of the washer being generally convex and said other face of the washer being generally concave, said one face being presented toward said head, said faces sloping away from the region of said hole toward said edge throughout substantially the entire perimetral extent thereof, rib means projecting axially from said generally concave face and extending to said edge and being disposed in a pattern such that upon threading the screw into the recess with a wire in a position with either pair of said edge portions respectively adjacent said side parts of the terminal, the wire will be gripped by the rib means and terminal irrespective of the orientation of the washer on the terminal and the pressure applied by the screw head to said convex surface will cause the washer to tilt in a direction tending to urge the wire toward said screw, the rib means being of sufficient axial extent to prevent said edge at said concave surface from cutting the wire, and said rib means are tapered from said edge toward the region of said hole to facilitate camming the wire toward said screw.

2. A fastener according to claim 1 in which the hole in the washer is tapered from the convex side toward the concave side to facilitate tilting of the washer.

3. A fastener according to claim 1 in which the rib means comprise four ribs and each rib extends from the hole radially outwardly to a corner point of the washer.

4. A fastener according to claim 1 in which the washer has an axial recess on said concave face and surrounding said hole and being of such size as to telescopically receive said flange means.

5. A washer having a body with a generally concave surface on one face and a generally convex surface on the opposite face, said body having a hole therethrough that tapers from the convex surface to the concave surface, the face with the concave surface having a recess that surrounds the hole to reduce the thickness of the body thereat, and rib means projecting axialy away from said concave surface and tapering generally from a minimum depth adjacent to the recess to a maximum depth adjacent to a peripheral edge of the body at the concave surface, said rib means comprising four ribs, each of which extends from the recess radially outwardly to said peripheral edge of the washer.

6. A washer having a body, a peripheral edge of said body having corners which define substantially a regular polygon, said body having a generally concave surface on one face and a generally convex surface on the opposite face, said body having an axial hole therethrough that tapers from the convex surface to the concave surface, and rib means projecting axially away from said concave surface with the axial extent of the rib means being at least as great as the axial extent of the edge of the body at the concave surface, the rib means also extending radially from the hole to the corners of the body at said concave surface, the face with the concave surface having a recess that surrounds the hole to reduce the thickness of the body thereat.

7. A washer according to claim 6 in which the rib means is of variable axial extent with the greater axial extent being adjacent to said edge of the body and the lesser axial extent being adjacent to said recess.

8. A fastener for securing a wire to an electrical terminal having a threaded recess, said fastener comprising a screw having a head and a threaded shank for threading into the recess, a washer having a hole therethrough for loosely receiving said screw, said hole being tapered from one face of the washer to the other face thereof, radially outwardly projecting flange means on said shank intermediate the thread and head and being of a diameter larger than that of the hole at said other face and cooperating with the head for retaining the washer against axial retraction from the screw, said washer having a peripheral edge that surrounds the screw and defines substantially a regular polygon and is adapted to cooperate with parts of the terminal to prevent rotation of the washer during assembly of the fastener with the terminal, said one face of the washer being convex and said other face of the washer being generally concave and having an axial recess that surrounds the hole to reduce the thickness of the washer thereat, said recess being of such size as to be capable of loosely receiving said flange means, four uniformly spaced apart rib means projecting axially from said generally concave face and extending radially from the axial recess to the edge of the washer so that upon threading the screw into the recess with a wire between the rib means and the terminal the wire will be gripped by the rib means and terminal, the rib means being of sufficient axial extent to prevent the edge of the washer at said concave surface from cutting the wire and the rib means being of such generally tapered contour as to urge the wire toward the screw.

References Cited
UNITED STATES PATENTS

| | | | |
|---|---|---|---|
| 812,287 | 2/1906 | Nagel | 339—246 X |
| 830,572 | 9/1906 | Cutter | 339—246 |
| 2,712,123 | 6/1955 | Wibell et al. | 339—246 |
| 3,081,507 | 3/1963 | Gribble | 339—246 X |
| 3,141,722 | 7/1964 | Nielson | 339—246 |
| 3,163,483 | 12/1964 | Lineberger | 339—269 X |
| 3,167,376 | 1/1965 | Edwards | 339—269 X |
| 3,177,456 | 4/1965 | Haydu et al. | 339—270 X |

MARVIN A. CHAMPION, *Primary Examiner.*

EDWARD C. ALLEN, *Examiner.*

PERRY TEITELBAUM, *Assistant Examiner.*